United States Patent
Yu et al.

(10) Patent No.: US 12,047,394 B2
(45) Date of Patent: Jul. 23, 2024

(54) ANTI-PSEUDO BASE STATION METHOD AND APPARATUS, AND COMPUTER-READABLE STORAGE MEDIUM

(71) Applicant: ZTE Corporation, Shenzhen (CN)

(72) Inventors: Wantao Yu, Shenzhen (CN); Zhenhua Xie, Shenzhen (CN); Jin Peng, Shenzhen (CN); Shilin You, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 99 days.

(21) Appl. No.: 17/423,773

(22) PCT Filed: Oct. 21, 2019

(86) PCT No.: PCT/CN2019/112265
§ 371 (c)(1),
(2) Date: Jul. 16, 2021

(87) PCT Pub. No.: WO2020/147354
PCT Pub. Date: Jul. 23, 2020

(65) Prior Publication Data
US 2022/0124105 A1    Apr. 21, 2022

(30) Foreign Application Priority Data
Jan. 18, 2019   (CN) .......................... 201910048609.9

(51) Int. Cl.
*H04L 9/40*    (2022.01)
*H04W 12/0431*  (2021.01)
(Continued)

(52) U.S. Cl.
CPC ..... *H04L 63/1416* (2013.01); *H04W 12/0431* (2021.01); *H04W 12/06* (2013.01);
(Continued)

(58) Field of Classification Search
CPC .......... H04L 63/1416; H04W 12/0431; H04W 12/128; H04W 12/06
See application file for complete search history.

(56) References Cited

U.S. PATENT DOCUMENTS 9,226,324 B2 * 12/2015 Otowa .................. H04W 76/10
9,686,687 B2 *  6/2017 Peng ..................... H04W 12/08
(Continued)

FOREIGN PATENT DOCUMENTS

CN    104581710 A    4/2015
CN    105722077 A    6/2016
(Continued)

OTHER PUBLICATIONS

3GPP TSG SA WG3 (Security) Meeting #93, Huawei, Hisilicon, "Protecting UE from connecting to fake basestation during HO", Nov. 12-16, 2018, S3-183357.
(Continued)

*Primary Examiner* — Viral S Lakhia
(74) *Attorney, Agent, or Firm* — CANTOR COLBURN LLP (57) ABSTRACT

An anti-pseudo base station method and apparatus, and a computer-readable storage medium are provided. The anti-pseudo base station method includes: sending, by a base station, first anti-pseudo base station capacity information to a mobile terminal, wherein the first anti-pseudo base station capacity information is used for identifying an anti-pseudo base station capacity of the base station.

17 Claims, 6 Drawing Sheets

(51) Int. Cl.
*H04W 12/06* (2021.01)
*H04W 12/122* (2021.01)
*H04W 12/128* (2021.01)
*H04W 36/08* (2009.01)

(52) U.S. Cl.
CPC ....... *H04W 12/122* (2021.01); *H04W 12/128* (2021.01); *H04W 36/08* (2013.01)

(56) References Cited

U.S. PATENT DOCUMENTS

| | | | |
|---|---|---|---|
| 9,781,137 B2* | 10/2017 | Szucs | H04L 63/1416 |
| 9,838,871 B2* | 12/2017 | Hartley | H04W 12/50 |
| 9,867,039 B2* | 1/2018 | Wang | H04W 12/122 |
| 10,002,475 B2* | 6/2018 | Krishnan | H04L 12/2803 |
| 10,164,700 B2* | 12/2018 | Chen | H04B 17/17 |
| 10,271,360 B2* | 4/2019 | Zhang | H04L 5/0053 |
| 10,595,248 B2* | 3/2020 | Han | H04W 12/122 |
| 10,764,260 B2* | 9/2020 | Kamm | H04L 9/3247 |
| 11,190,541 B2* | 11/2021 | Nakajima | H04L 63/1416 |
| 11,233,786 B2* | 1/2022 | Ma | H04L 63/107 |
| 2012/0189122 A1 | 7/2012 | Huang | |
| 2013/0005384 A1* | 1/2013 | Tanaka | H04M 1/24 455/517 |
| 2014/0162630 A1* | 6/2014 | Otowa | H04W 24/06 455/425 |
| 2016/0269902 A1* | 9/2016 | Peng | H04W 12/08 |
| 2017/0201884 A1* | 7/2017 | Zhong | H04L 9/0894 |
| 2017/0223538 A1* | 8/2017 | Hahn | H04W 8/20 |
| 2017/0347249 A1* | 11/2017 | Huang | H04W 4/14 |
| 2018/0027524 A1* | 1/2018 | Zhang | H04W 76/10 455/453 |
| 2019/0059032 A1* | 2/2019 | Han | H04W 12/122 |
| 2021/0218731 A1* | 7/2021 | Ma | H04L 9/0863 |

FOREIGN PATENT DOCUMENTS

| | | |
|---|---|---|
| CN | 106028340 A | 10/2016 |
| CN | 106686600 A | 5/2017 |
| CN | 107172621 A | 9/2017 |
| WO | 2018218518 A1 | 12/2018 |
| WO | 2018231426 A1 | 12/2018 |

OTHER PUBLICATIONS

International Search Report for corresponding application PCT/CN2019/112265 filed Oct. 21, 2019; Mail date Jan. 23, 2020.
European Search Report for corresponding application EP19910875; Report dated Feb. 10, 2022.

* cited by examiner

ANTI-PSEUDO BASE STATION METHOD AND APPARATUS, AND COMPUTER-READABLE STORAGE MEDIUM

CROSS REFERENCE

This application is a National Stage Filing of the PCT International Application No. PCT/CN2019/112265 filed on Oct. 21, 2019, which claims priority to Chinese Application No. 201910048609.9 filed on Jan. 18, 2019, the entirety of which is herein incorporated by reference.

TECHNICAL FIELD

The embodiment of the disclosure relates to, but is not limited to, an anti-pseudo base station method and apparatus, and a computer-readable storage medium.

BACKGROUND

The 3rd generation partnership project (3GPP) has formulated various mobile network specifications, but mobile networks deployed according to these specifications are being attacked by various pseudo base stations. Therefore, it is necessary to provide a solution to guard against pseudo base stations.

SUMMARY

At least one embodiment of the disclosure provides an anti-pseudo base station method and apparatus, and a computer-readable storage medium, which can guard against attacks from pseudo base stations and improve network security.

At least one embodiment of the disclosure provides an anti-pseudo base station method. The method includes:
  sending first anti-pseudo base station capacity information to a mobile terminal by a base station, wherein the first anti-pseudo base station capacity information is used for identifying an anti-pseudo base station capacity of the base station.

At least one embodiment of the disclosure provides an anti-pseudo base station method. The method includes:
  receiving, by a mobile terminal, first anti-pseudo base station capacity information sent by a base station, and determining an anti-pseudo base station capacity of the base station according to the first anti-pseudo base station capacity information; and
  starting, by the mobile terminal, an authentication and key agreement and distribution process matching the anti-pseudo base station capacity of the base station.

At least one embodiment of the disclosure provides an anti-pseudo base station method. The method includes:
  receiving, by a mobile terminal, first anti-pseudo base station capacity information sent by a base station, and determining an anti-pseudo base station capacity of the base station according to the first anti-pseudo base station capacity information; and
  starting, by the mobile terminal, an authentication and key agreement and distribution process matching the anti-pseudo base station capacity of the base station and an anti-pseudo base station capacity of the mobile terminal.

At least one embodiment of the disclosure provides an anti-pseudo base station apparatus. The apparatus includes a memory and a processor, wherein the processor stores a program, and the program implements the anti-pseudo base station method of any embodiment when read and executed by the processor.

At least one embodiment of the disclosure provides a computer-readable storage medium, where one or more programs are stored in the computer-readable storage medium, wherein the one or more programs are capable of being executed by one or more processors, so as to implement the anti-pseudo base station method of any embodiment.

Compared with the related art, in at least one embodiment of the disclosure, the base station sends the first anti-pseudo base station capacity information to the mobile terminal, wherein the first anti-pseudo base station capacity information is used for identifying the anti-pseudo base station capacity of the base station. According to the solution provided by at least one embodiment, the terminal can be informed of the anti-pseudo base station capacity of the base station conveniently, and then perform the corresponding authentication and key agreement and distribution process, thus improving the network security.

Other features and advantages of the disclosure will be set forth in the following specification, and will partially become apparent in the specification, or may be learned by implementing the disclosure. An objective and other advantages of the disclosure may be achieved and obtained through structures particularly indicated in the specification, the claims and accompanying drawings.

BRIEF DESCRIPTION OF THE DRAWINGS

The accompanying drawings are used to provide further comprehension of a technical solution of the disclosure, and constitute a portion of the specification. The accompanying drawings are used to explain the technical solution of the disclosure together with embodiments of the disclosure, and do not constitute a limitation on the technical solution of the disclosure.

DETAILED DESCRIPTION OF THE EMBODIMENTS

In order to make objectives, technical solutions and advantages of the disclosure clearer, the following will describe embodiments of the disclosure in detail with reference to accompanying drawings. It should be noted that the embodiments in the disclosure and features in the embodiments may be combined arbitrarily if there is no conflict.

Operations shown in the flowchart of the accompanying drawings may be executed, for example, in a computer system for a set of computer-executable instructions. Although a logical sequence is shown in the flowchart, in some cases, the operations shown or described may be executed in a sequence different from that stated herein.

One of main reasons that attacks can be made is that a mobile terminal cannot authenticate a base station, and therefore receives various instructions sent by a pseudo base station. In order to enable to authenticate the base station, key information is distributed to the base station and the mobile terminal, such that the base station can protect a sent message or a portion of contents of the sent message according to the key information, and the mobile terminal can authenticate the message sent by the base station according to the key information, and then can authenticate the base station (the pseudo base station cannot be connected to a mobile network and therefore cannot obtain the key information).

After the anti-pseudo base station key information is configured for the base station and the mobile terminal, since an anti-pseudo base station key may be a symmetric key or an asymmetric key, it is necessary for the mobile terminal to start different anti-pseudo base station key distribution processes as well as authentication and key agreement processes when the mobile terminal accesses a network. However, there is no indication information about whether the base station has an anti-pseudo base station capacity in the message sent by the base station at present, such that the mobile terminal cannot learn whether the base station has the anti-pseudo base station capacity, and thus cannot start the authentication and key agreement and distribution process matching the anti-pseudo base station capacity of the base station.

In the embodiments of the disclosure, the base station may be configured to support an anti-pseudo base station function, and after obtaining the anti-pseudo base station key, the base station supporting the anti-pseudo base station function may realize, together with the mobile terminal supporting the anti-pseudo base station function, an anti-pseudo base station function based on the obtained anti-pseudo base station key. The anti-pseudo base station capacity of the base station may be regarded as a capacity of the base station, which is identified by anti-pseudo base station capacity information.

In the embodiments of the disclosure, the mobile terminal may be a mobile terminal preconfigured to support an anti-pseudo base station function. The mobile terminal may alternatively receive an instruction from a user interface, for example, an instruction from a user, to set the mobile terminal to support the anti-pseudo base station function.

In the embodiments of the disclosure, the anti-pseudo base station capacity may be regarded as a capacity of the terminal, and may be identified by anti-pseudo base station capacity information.

In the embodiments of the disclosure, the anti-pseudo base station capacity information of the mobile terminal and the anti-pseudo base station capacity information of the base station may be identical or different.

Figure 1:
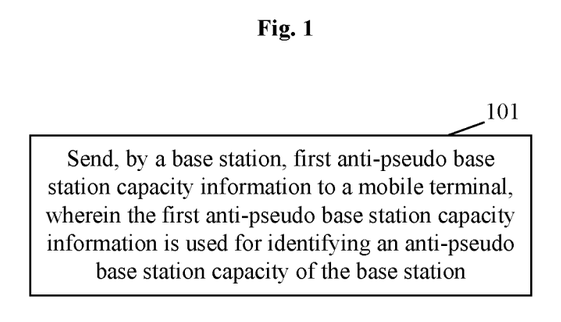
FIG. 1 is a flowchart (from the perspective of a base station) of an anti-pseudo base station method provided by an embodiment of the disclosure.

As shown in FIG. 1, an embodiment of the disclosure provides an anti-pseudo base station method. The method includes the following operations.

At operation 101, a base station sends first anti-pseudo base station capacity information to a mobile terminal, wherein the first anti-pseudo base station capacity information is used for identifying an anti-pseudo base station capacity of the base station.

In at least one embodiment, the base station sends the first anti-pseudo base station capacity information to the mobile terminal via a broadcast message. It should be noted that the first anti-pseudo base station capacity information may also be sent via other messages.

In at least one embodiment, the first anti-pseudo base station capacity information is used for identifying the anti-pseudo base station capacity of the base station, specifically, the first anti-pseudo base station capacity information is used for identifying whether the base station supports the anti-pseudo base station capacity.

In at least one embodiment, the first anti-pseudo base station capacity information includes a key system to which an anti-pseudo base station key supported or used by the base station belongs in a case where the base station supports the anti-pseudo base station capacity.

In at least one embodiment, the key system of the anti-pseudo base station key supported or used by the base station includes: a symmetric key, an asymmetric key, or a symmetric key and an asymmetric key. That is, the base station supporting the anti-pseudo base station function may support an anti-pseudo base station key of a symmetric key system, or an anti-pseudo base station key of an asymmetric key system, or both an anti-pseudo base station key of a symmetric key system and an anti-pseudo base station key of an asymmetric key system at the same time.

In at least one embodiment, the method may further include executing, by the base station, an authentication and key agreement and distribution process matching the anti-pseudo base station capacity of the base station and an anti-pseudo base station capacity of the mobile terminal. After receiving the first anti-pseudo base station capacity information sent by the base station, the mobile terminal starts an authentication and key agreement and distribution process matching the anti-pseudo base station capacity of the base station and an anti-pseudo base station capacity of the mobile terminal. The base station cooperates with the mobile terminal to execute the authentication and key agreement and distribution process.

In at least one embodiment, in a case where the anti-pseudo base station key of the base station with the anti-pseudo base station function is the symmetric key, and when a mobile terminal with an anti-pseudo base station capacity identical to that of the base station accesses and attaches to a network or when the mobile terminal with the anti-pseudo base station capacity identical to that of the base station reselects a cell, the authentication and key agreement and distribution process matching the symmetric key will be started.

In at least one embodiment, in a case where the anti-pseudo base station key of the base station with the anti-pseudo base station function is the asymmetric key, and when a mobile terminal with an anti-pseudo base station capacity identical to that of the base station accesses a network or when the mobile terminal with the anti-pseudo base station capacity identical to that of the base station reselects a cell, the authentication and key agreement and distribution process corresponding to the asymmetric key will be started.

In another embodiment, if the first anti-pseudo base station capacity information sent by the base station indicates that the base station does not support the anti-pseudo base station capacity, the terminal performs an authentication and key agreement procedure without an anti-pseudo base station function, for example, an extensible authentication protocol-authentication and key agreement (EAP-AKA) process.

Figure 2:
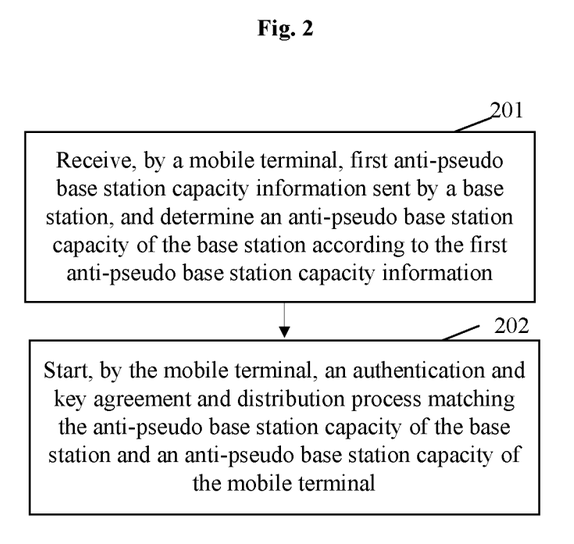
FIG. 2 is a flowchart (from the perspective of a terminal) of an anti-pseudo base station method provided by another embodiment of the disclosure.

As shown in FIG. 2, an embodiment of the disclosure provides an anti-pseudo base station method. The method includes the following operations.

At operation 201, a mobile terminal receives first anti-pseudo base station capacity information sent by a base station, and determines an anti-pseudo base station capacity of the base station according to the first anti-pseudo base station capacity information.

At operation 202, the mobile terminal is preset to support the anti-pseudo base station function or is set by a user to support the anti-pseudo base station function through a user interface. The mobile terminal starts an authentication and key agreement and distribution process matching the anti-pseudo base station capacity of the base station. In addition, the anti-pseudo base station function may be regarded as a capacity of the terminal. The mobile terminal with the anti-pseudo base station capacity starts an authentication and key agreement and distribution process matching the anti-pseudo base station capacity of the base station and the anti-pseudo base station capacity of the mobile terminal.

The mobile terminal may be a mobile terminal preconfigured to support the anti-pseudo base station function. The mobile terminal may also be set by the user to support the anti-pseudo base station function through the user interface. The anti-pseudo base station capacity may be regarded as the capacity of the terminal, and may be identified by second anti-pseudo base station capacity information. The method may further include pre-configure the second anti-pseudo base station capacity information, or provide an anti-pseudo base station capacity information setting function, and determine the second anti-pseudo base station capacity information according to setting obtained via the anti-pseudo base station capacity information setting function.

The second anti-pseudo base station capacity information of the mobile terminal and the first anti-pseudo base station capacity information of the base station may be identical or different.

In at least one embodiment, the anti-pseudo base station capacity of the mobile terminal is determined according to the second anti-pseudo base station capacity information of the mobile terminal, wherein the second anti-pseudo base station capacity information is used for identifying the anti-pseudo base station capacity of the mobile terminal, that is, used for identifying whether the mobile terminal supports the anti-pseudo base station capacity.

In at least one embodiment, the second anti-pseudo base station capacity information further indicates a key system to which an anti-pseudo base station key supported or used by the mobile terminal belongs in a case where the mobile terminal supports the anti-pseudo base station capacity. That is, the second anti-pseudo base station capacity information includes a key system to which an anti-pseudo base station key supported or used by the mobile terminal belongs in a case where the mobile terminal supports the anti-pseudo base station capacity.

In at least one embodiment, the key system of the anti-pseudo base station key supported or used by the mobile terminal includes a symmetric key, an asymmetric key, or a symmetric key and an asymmetric key. That is, the mobile terminal supporting the anti-pseudo base station function may support an anti-pseudo base station key of a symmetric key system, or an anti-pseudo base station key of an asymmetric key system, or both an anti-pseudo base station key of a symmetric key system and an anti-pseudo base station key of an asymmetric key system at the same time.

In at least one embodiment, the operation that the mobile terminal starts the authentication and key agreement and distribution process matching the anti-pseudo base station capacity of the base station and the anti-pseudo base station capacity of the mobile terminal includes the following operations.

The mobile terminal starts the authentication and key agreement and distribution process matching the anti-pseudo base station capacity of the base station and the anti-pseudo base station capacity of the mobile terminal when the mobile terminal accesses and attaches to a network through the base station with the anti-pseudo base station capacity identical to the anti-pseudo base station capacity of the mobile terminal or when the mobile terminal reselects a cell.

There are several situations for the starting of the authentication and key agreement and distribution process matching the anti-pseudo base station capacity of the base station and the anti-pseudo base station capacity of the mobile terminal.

If one of the base station and the mobile terminal does not support the anti-pseudo base station capacity, or both of the base station and the mobile terminal do not support the anti-pseudo base station capacity, the authentication and key agreement process without the anti-pseudo base station function, for example, the EAP-AKA process, is started and executed.

If both the base station and the mobile terminal support the anti-pseudo base station capacity, and the key systems of the anti-pseudo base station keys used by the base station and the mobile terminal are identical, then the authentication and key agreement and distribution process corresponding to the key systems of the anti-pseudo base station keys are used.

For example, in at least one embodiment, the operation that the mobile terminal starts the authentication and key agreement and distribution process matching the anti-pseudo base station capacity of the base station and the anti-pseudo base station capacity of the mobile terminal includes:

the mobile terminal starts, in a case where the anti-pseudo base station key of the mobile terminal is the symmetric key and the base station supports the symmetric key, the authentication and key agreement and distribution process corresponding to the symmetric key.

For another example, in at least one embodiment, the operation that the mobile terminal starts the authentication and key agreement and distribution process matching the anti-pseudo base station capacity of the base station and the anti-pseudo base station capacity of the mobile terminal includes:

the mobile terminal starts, in a case where the anti-pseudo base station key of the mobile terminal is an asymmetric key and the base station supports the asymmetric key, the authentication and key agreement and distribution process corresponding to the asymmetric key.

In at least one embodiment, in a case where the anti-pseudo base station key of the mobile terminal with the anti-pseudo base station function is the symmetric key, the authentication and key agreement and distribution process corresponding to the symmetric key is started when the mobile terminal accesses and attaches to a network through the base station with the anti-pseudo base station capacity identical to the anti-pseudo base station capacity of the mobile terminal or when the mobile terminal reselects a cell.

In at least one embodiment, in a case where the anti-pseudo base station key of the mobile terminal with the anti-pseudo base station function is the asymmetric key, the authentication and key agreement and distribution process corresponding to the asymmetric key is started when the mobile terminal accesses a network through the base station with the anti-pseudo base station capacity identical to that of the mobile terminal or when the mobile terminal reselects a cell.

In at least one embodiment, the base station may detect and identify the second anti-pseudo base station capacity information of the mobile terminal.

In at least one embodiment, the mobile terminal may detect and identify the first anti-pseudo base station capacity information of the base station.

In at least one embodiment, the mobile terminal may be preconfigured to support the anti-pseudo base station function, and may also be set by the user to support the anti-pseudo base station function through the user interface of the mobile terminal.

In the embodiments of the disclosure, the mobile terminal may be user equipment (UE for short) or other terminal apparatuses supporting mobile communication.

Figure 3:
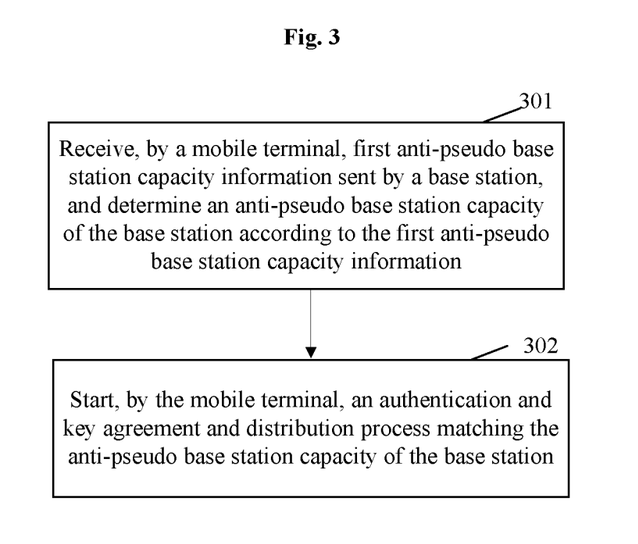
FIG. 3 is a schematic flowchart (another implementation from the perspective of a terminal) of an anti-pseudo base station method provided by an embodiment of the disclosure.

FIG. 3 is an anti-pseudo base station method provided by an embodiment of the disclosure. The method includes the following operations.

At operation 301, a mobile terminal receives first anti-pseudo base station capacity information sent by a base station, and determines an anti-pseudo base station capacity of the base station according to the first anti-pseudo base station capacity information.

At operation 302, the mobile terminal starts an authentication and key agreement and distribution process matching the anti-pseudo base station capacity of the base station.

In at least one embodiment, the method may further include: the mobile terminal is preset to support the anti-pseudo base station function, or receives an instruction through a user interface to set the mobile terminal to support the anti-pseudo base station function. That is, the anti-pseudo base station function is a function of the terminal. When the terminal has the function, a matching authentication and key distribution process are directly performed according to the anti-pseudo base station capacity of the base station. When the terminal does not have this function, an authentication and key distribution process for a terminal not supporting the anti-pseudo base station capacity is used.

The first anti-pseudo base station capacity information is used for identifying the anti-pseudo base station capacity of the base station. The first anti-pseudo base station capacity information includes a key system to which an anti-pseudo base station key supported or used by the base station belongs in a case where the base station supports the anti-pseudo base station capacity.

In at least one embodiment, the operation that the mobile terminal starts the authentication and key agreement and distribution process matching the anti-pseudo base station capacity of the base station includes:

the mobile terminal starts, in a case where the anti-pseudo base station key supported or used by the base station is a symmetric key, the authentication and key agreement and distribution process corresponding to the symmetric key.

In at least one embodiment, the operation that the mobile terminal starts the authentication and key agreement and distribution process matching the anti-pseudo base station capacity of the base station includes:

the mobile terminal starts, in a case where the anti-pseudo base station key supported or used by the base station is an asymmetric key, the authentication and key agreement and distribution process corresponding to the asymmetric key.

In at least one embodiment, the operation that the mobile terminal starts the authentication and key agreement and distribution process matching the anti-pseudo base station capacity of the base station includes:

the mobile terminal starts the authentication and key agreement and distribution process matching the anti-pseudo base station capacity of the base station when the mobile terminal accesses and attaches to a network through the base station with the anti-pseudo base station capacity or when the mobile terminal reselects a cell.

Figure 4:
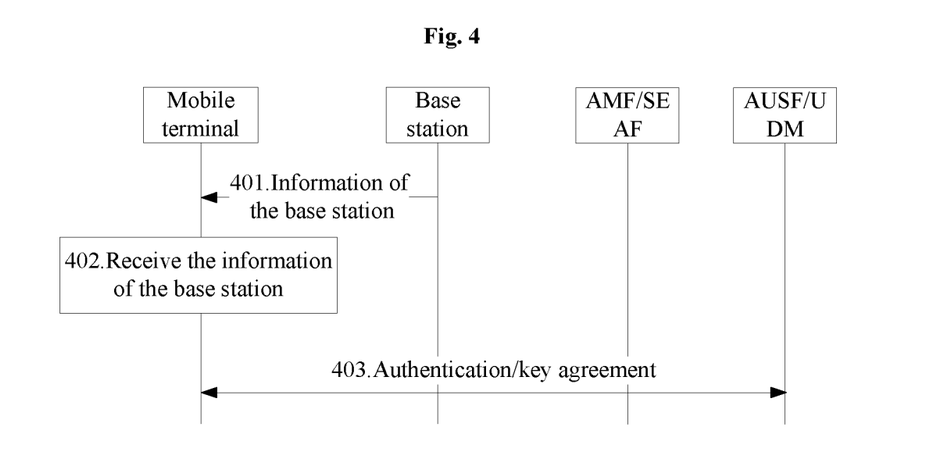
FIG. 4 is a schematic flowchart of an anti-pseudo base station method provided by an embodiment of the disclosure.

FIG. 4 is a schematic flowchart of an anti-pseudo base station method provided by an embodiment of the disclosure. In a first aspect of the disclosure, when a base station supports the anti-pseudo base station function, and a mobile terminal is not preset to support the anti-pseudo base station function, or a user does not set the mobile terminal to support the anti-pseudo base station function through a user interface, as shown in FIG. 4, a specific flow when the mobile terminal accesses and attaches to a network or when the mobile terminal reselects a cell includes the following operations.

At operation 401, the base station carries first anti-pseudo base station capacity information in a sent message.

The message is, for example, a broadcast message.

At operation 402, the mobile terminal receives the message sent by the base station.

at operation 403, the mobile terminal does not detect the first anti-pseudo base station capacity information in the message, and directly starts, with a network (an access and mobility management function (AMF)/a security anchor function (SEAF)/an authentication server function (AUSF)/unified data management (UDM)), an authentication and key agreement process without an anti-pseudo base station function, for example, an extensible authentication protocol-authentication and key agreement (EAP-AKA) process.

Figure 5:
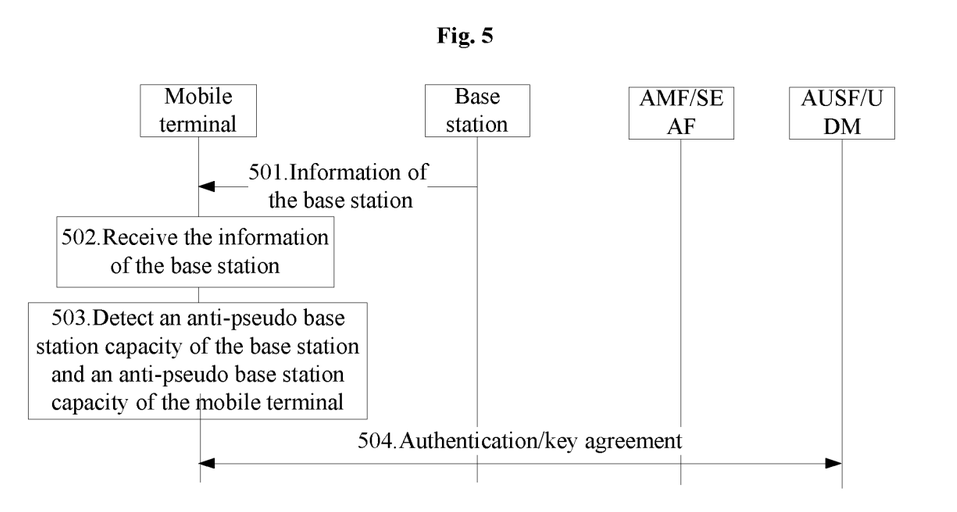
FIG. 5 is a schematic flowchart of an anti-pseudo base station method provided by an embodiment of the disclosure.

FIG. 5 is a schematic diagram of an anti-pseudo base station method provided by another embodiment of the disclosure. In a second aspect of the disclosure, when a base station supports the anti-pseudo base station function, and a mobile terminal is preset to support the anti-pseudo base station function, or a user sets the mobile terminal to support the anti-pseudo base station function through a user interface, as shown in FIG. 5, a specific flow when the mobile terminal accesses and attaches to a network or when the mobile terminal reselects a cell includes the following operations.

At operation 501, the base station carries first anti-pseudo base station capacity information in a sent message, for example, a broadcast message.

At operation 502, the mobile terminal receives the message sent by the base station.

At operation 503, the mobile terminal detects the first anti-pseudo base station capacity information in the message, determines an anti-pseudo base station capacity of the base station according to the first anti-pseudo base station capacity information, and detects an anti-pseudo base station capacity of the mobile terminal.

At operation 504, the mobile terminal starts, with a network (an access and mobility management function (AMF)/a security anchor function (SEAF)/an authentication server function (AUSF)/unified data management (UDM)), an authentication and key agreement and distribution process matching the anti-pseudo base station capacity of the base station and the anti-pseudo base station capacity of the mobile terminal.

Figure 6:
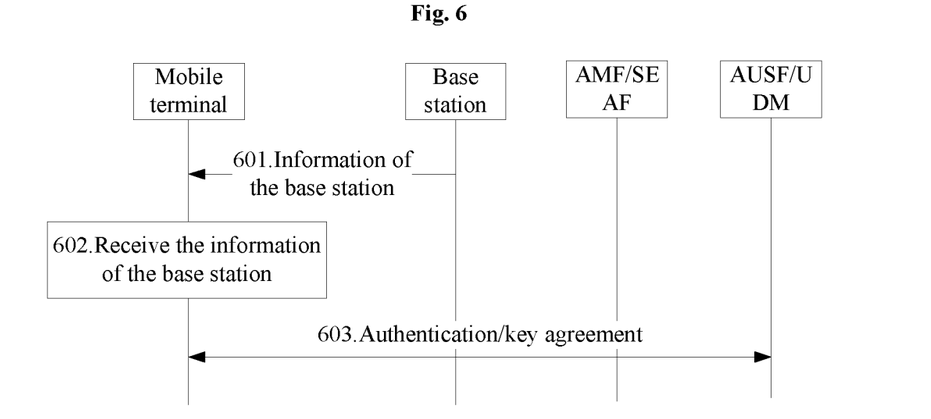
FIG. 6 is a schematic flowchart of an anti-pseudo base station method provided by an embodiment of the disclosure.

FIG. 6 is a schematic flowchart of an anti-pseudo base station method provided by another embodiment of the disclosure. In a third aspect of the disclosure, when a base station does not support the anti-pseudo base station function, and a mobile terminal is preset not to support the anti-pseudo base station function, or a user does not set the mobile terminal to support the anti-pseudo base station function through a user interface, as shown in FIG. 6, a specific flow when the mobile terminal accesses and attaches to a network or when the mobile terminal reselects a cell includes the following operations.

At operation 601, the base station carries first anti-pseudo base station capacity information in a sent message, for example, a broadcast message or does not carry first anti-pseudo base station capacity information.

At operation 602, the mobile terminal receives the message sent by the base station.

At operation 603, the mobile terminal does not detect the first anti-pseudo base station capacity information in the message of the base station, and directly starts, with a network (an access and mobility management function (AMF)/a security anchor function (SEAF)/an authentication server function (AUSF)/unified data management (UDM)), an authentication and key agreement process without an anti-pseudo base station function, for example, an extensible authentication protocol-authentication and key agreement (EAP-AKA) process.

Figure 7:
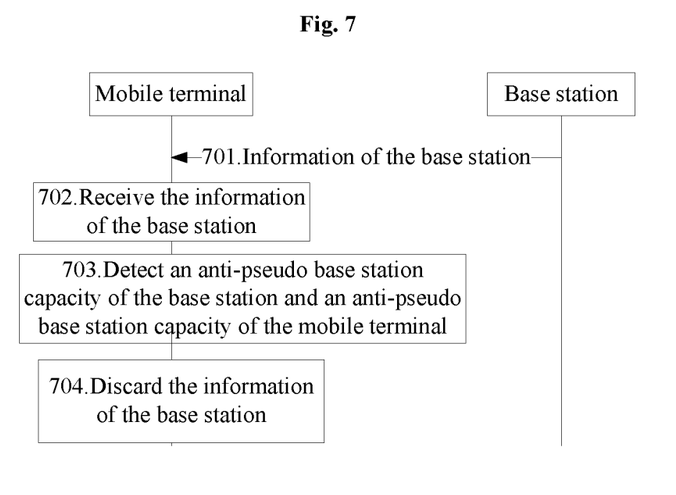
FIG. 7 is a schematic flowchart of an anti-pseudo base station method provided by an embodiment of the disclosure.

FIG. 7 is a schematic flowchart of an anti-pseudo base station method provided by another embodiment of the disclosure. In a fourth aspect of the disclosure, when a base station does not support the anti-pseudo base station function, and a mobile terminal is preset to support the anti-pseudo base station function, or a user sets the mobile terminal to support the anti-pseudo base station function through a user interface, as shown in FIG. 7, a specific flow when the mobile terminal accesses and attaches to a network or when the mobile terminal reselects a cell includes the following operations.

At operation 701, the base station carries first anti-pseudo base station capacity information in a sent message, for example, a broadcast message or does not carry first anti-pseudo base station capacity information.

At operation 702, the mobile terminal receives the message sent by the base station.

At operation 703, the mobile terminal detects the first anti-pseudo base station capacity information in the message of the base station, and detects an anti-pseudo base station capacity of the mobile terminal at the same time.

At operation 704, if the mobile terminal determines that the mobile terminal supports the anti-pseudo base station function and determines that the base station does not support the anti-pseudo base station function, the terminal discards the received message of the base station.

Figure 8:
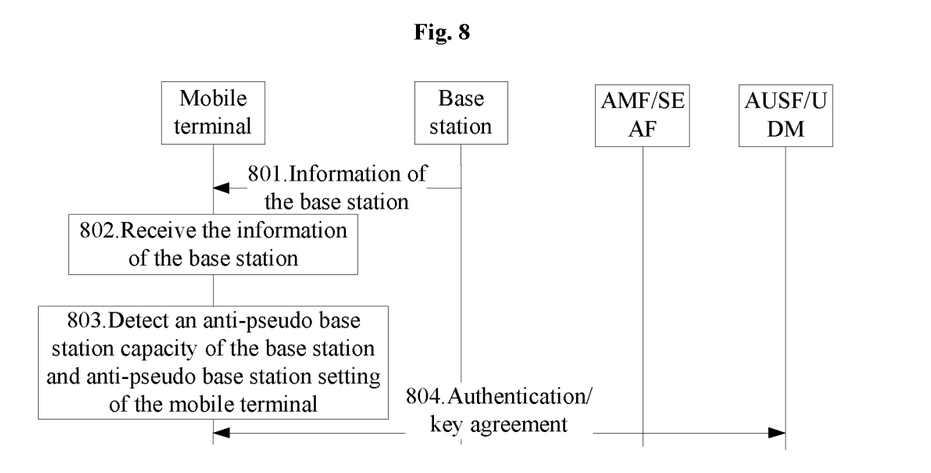
FIG. 8 is a schematic flowchart of an anti-pseudo base station method provided by an embodiment of the disclosure.

FIG. 8 is a schematic diagram of an anti-pseudo base station method provided by another embodiment of the disclosure. In a second aspect of the disclosure, when a base station supports the anti-pseudo base station function, and the mobile terminal is preset to support the anti-pseudo base station function, or a user sets the mobile terminal to support the anti-pseudo base station function through a user interface, as shown in FIG. 8, a specific flow when the mobile terminal accesses and attaches to the network or when the mobile terminal reselects a cell includes the following operations.

At operation 801, the base station carries first anti-pseudo base station capacity information in a sent message, for example, a broadcast message.

At operation 802, the mobile terminal receives the message sent by the base station.

At operation 803, the mobile terminal detects the first anti-pseudo base station capacity information in the message, determines an anti-pseudo base station capacity of the base station according to the first anti-pseudo base station capacity information, and detects anti-pseudo base station setting of the mobile terminal.

At operation 804, when the terminal supports the anti-pseudo base station function, the mobile terminal starts, with a network (an access and mobility management function (AMF)/a security anchor function (SEAF)/an authentication server function (AUSF)/unified data management (UDM)), an authentication and key agreement and distribution process matching the anti-pseudo base station capacity of the base station.

Figure 9:
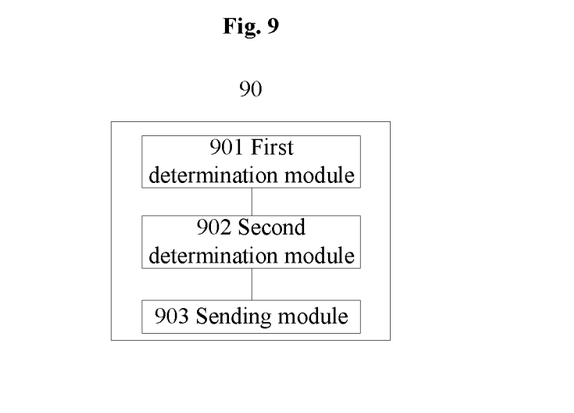
FIG. 9 is a schematic diagram 1 of an anti-pseudo base station apparatus provided by an embodiment of the disclosure.

An embodiment of the disclosure provides an anti-pseudo base station apparatus 90. As shown in FIG. 9, the anti-pseudo base station apparatus 90 includes:

a first determination module 901, configured to determine a key system to which an anti-pseudo base station key belongs on the base station, that is, to determine whether a base station key belongs to a symmetric key system or an asymmetric key system;

a second determination module 902, configured to determine first anti-pseudo base station capacity information of the base station, wherein the first anti-pseudo base station capacity information includes information of the key system to which the anti-pseudo base station key belongs; and a sending module 903, configured to send the first anti-pseudo base station capacity information to the base station. Specifically, the first anti-pseudo base station capacity information may be carried in the message sent by the base station.

Figure 10:
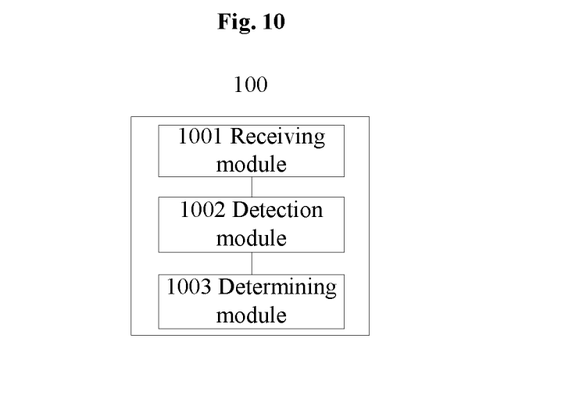
FIG. 10 is a schematic diagram 2 of an anti-pseudo base station apparatus provided by an embodiment of the disclosure.

As shown in FIG. 10, an embodiment of the disclosure provides an anti-pseudo base station apparatus 100. The anti-pseudo base station apparatus 100 includes:

a receiving module 1001, configured to receive a message sent by a base station;

a detection module 1002, configured to detect an anti-pseudo base station capacity of a mobile terminal and an anti-pseudo base station capacity of the base station; and a determining module 1003, configured to determine to start, according to the detection result, an authentication and key agreement and distribution process matching the anti-pseudo base station capacity of the base station and the anti-pseudo base station capacity of the mobile terminal.

Figure 11:
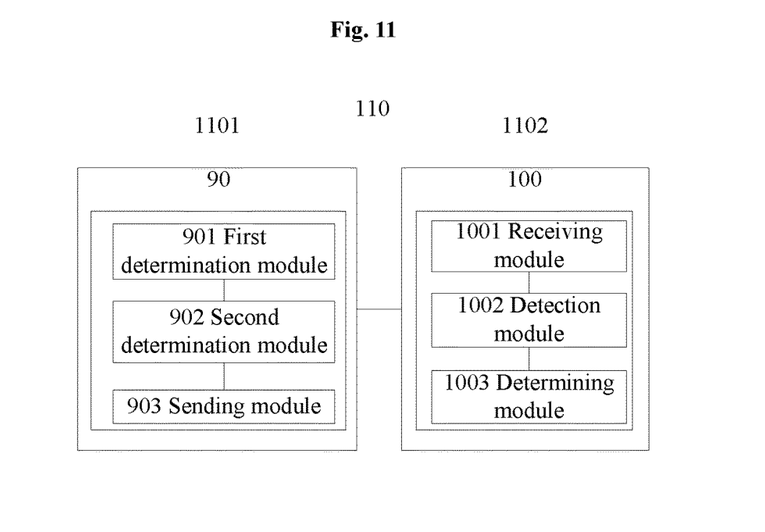
FIG. 11 is a schematic diagram of an anti-pseudo base station system provided by an embodiment of the disclosure.

As shown in FIG. 11, an embodiment of the disclosure provides an anti-pseudo base station system 110. The anti-pseudo base station system 110 includes:

a base station 1101, the base station 1101 including the anti-pseudo base station apparatus 90;

a mobile terminal 1102, the mobile terminal 1102 including the anti-pseudo base station apparatus 100; and the base station 1101 being connected to the mobile terminal 1102 through a wireless interface, for example, a 3rd generation partnership project (3GPP) wireless interface.

Figure 12:
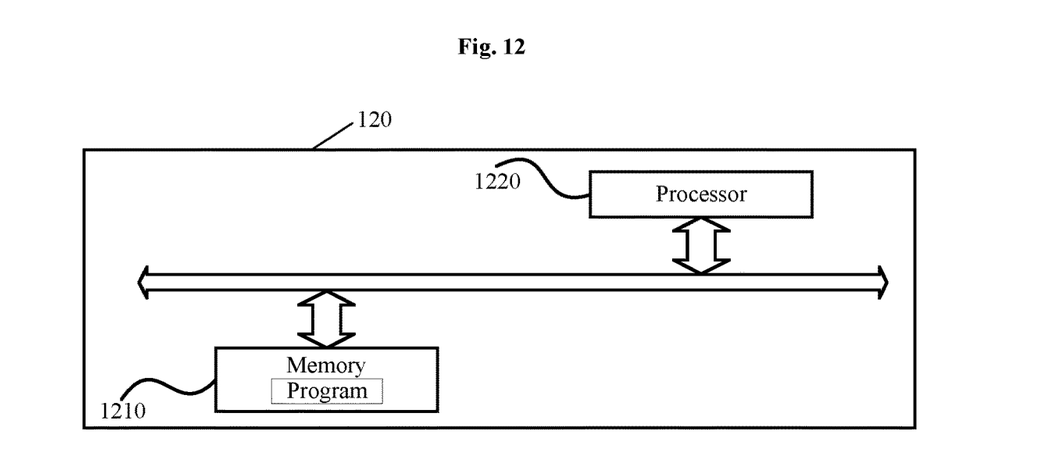
FIG. 12 is a schematic diagram of an anti-pseudo base station apparatus provided by an embodiment of the disclosure.

As shown in FIG. 12, an embodiment of the disclosure provides an anti-pseudo base station apparatus 120. The anti-pseudo base station apparatus includes a memory 1210 and a processor 1220, the processor 1210 storing a program, and the program implementing the anti-pseudo base station method of any embodiment when read and executed by the processor 1220.

Figure 13:
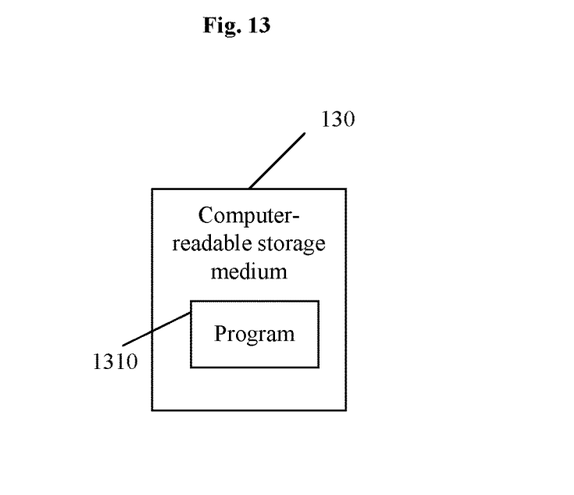
FIG. 13 is a schematic diagram of a computer-readable storage medium provided by an embodiment of the disclosure.

As shown in FIG. 13, an embodiment of the disclosure provides a computer-readable storage medium 130. One or more programs 1310 are stored in the computer-readable storage medium 130, the one or more programs 1310 being capable of being executed by one or more processors, so as to implement the anti-pseudo base station method of any embodiment.

It may be understood by a person of ordinary skill in the art that all or some of the operations and functional modules/units in the system and the apparatus disclosed above may be implemented as software, firmware, hardware and appropriate combinations thereof. In an implementation manner of the hardware, division between the functional modules/units mentioned in the above description does not necessarily correspond to division of physical components. For example, a physical component may have a plurality of functions, or a function or an operation may be cooperatively executed by several physical components. Some or all of the components may be implemented as software executed by the processor, such as a digital signal processor or a microprocessor, or as hardware, or as an integrated circuit, such as an application-specific integrated circuit. Such software may be distributed on the computer-readable medium, which may include a computer storage medium (or a non-transitory medium) and a communication medium (or a transitory medium). As well known to a person of ordinary skill in the art, the term computer storage medium includes volatile, nonvolatile, removable and non-removable media implemented in any method or technology for storing information (such as a computer-readable instruction, a data structure, a program module or other data). The computer storage medium includes, but is not limited to, a random access memory (RAM), a read only memory (ROM), an electrically erasable programmable read-only memory (EEPROM), a flash memory or other memory technologies, a compact disc read-only memory (CD-ROM), a digital versatile disc (DVD) or other optical disk storages, magnetic cassettes, magnetic tapes, magnetic disk storages or other magnetic storage apparatuses, or any other medium that may be used to store desired information and may be accessed by computers. Furthermore, it is well known to a person of ordinary skill in the art that the communication medium typically contains the computer-readable instruction, the data structure, the program module or other data in, for example, a carrier wave or a modulated data signal of other transmission mechanisms, and may include any information delivery medium.

What is claimed is:

1. An anti-pseudo base station method, comprising:

sending, by a base station, first anti-pseudo base station capacity information to a mobile terminal, wherein the first anti-pseudo base station capacity information is used for identifying whether the base station supports an anti-pseudo base station capacity, and the first anti-pseudo base station capacity information further comprises a key system to which an anti-pseudo base station key supported or used by the base station belongs in a case where the base station supports the anti-pseudo base station capacity, so that the mobile terminal start, based on the key system, an authentication and key agreement and distribution process matching the anti-pseudo base station capacity of the base station;

in a case that the first anti-pseudo base station capacity information sent by the base station indicates that the base station does not support the anti-pseudo base station capacity, the terminal performs an authentication and key agreement procedure without an anti-pseudo base station function.

2. The anti-pseudo base station method according to claim 1, wherein sending, by the base station, the first anti-pseudo base station capacity information to the mobile terminal comprises:

sending, by the base station, the first anti-pseudo base station capacity information to the mobile terminal via a broadcast message.

3. The anti-pseudo base station method according to claim 1, wherein the key system of the anti-pseudo base station key supported or used by the base station comprises a symmetric key, an asymmetric key, or a symmetric key and an asymmetric key.

4. The anti-pseudo base station method according to claim 1, further comprising executing, by the base station, an authentication and key agreement and distribution process matching the anti-pseudo base station capacity of the base station and an anti-pseudo base station capacity of the mobile terminal.

5. An anti-pseudo base station method, comprising:

receiving, by a mobile terminal, first anti-pseudo base station capacity information sent by a base station, and determining whether the base station supports an anti-pseudo base station capacity according to the first anti-pseudo base station capacity information, and the first anti-pseudo base station capacity information further comprises a key system to which an anti-pseudo base station key supported or used by the base station belongs in a case where the base station supports the anti-pseudo base station capacity; and based on the key system, starting, by the mobile terminal, an authentication and key agreement and distribution process matching the anti-pseudo base station capacity of the base station;

in a case that the first anti-pseudo base station capacity information sent by the base station indicates that the base station does not support the anti-pseudo base station capacity, the terminal performs an authentication and key agreement procedure without an anti-pseudo base station function.

6. The anti-pseudo base station method according to claim 5, further comprising:

presetting the mobile terminal to support an anti-pseudo base station function, or receiving an instruction through a user interface to set the mobile terminal to support the anti-pseudo base station function.

7. The anti-pseudo base station method according to claim 6, wherein the key system of the anti-pseudo base station key supported or used by the base station comprises a symmetric key, an asymmetric key, or a symmetric key and an asymmetric key.

8. The anti-pseudo base station method according to claim 5, wherein starting, by the mobile terminal, the authentication and key agreement and distribution process matching the anti-pseudo base station capacity of the base station comprises:
  starting, in a case where the anti-pseudo base station key supported or used by the base station is a symmetric key, the authentication and key agreement and distribution process corresponding to the symmetric key;
  or,
  starting, in a case where the anti-pseudo base station key supported or used by the base station is an asymmetric key, the authentication and key agreement and distribution process corresponding to the asymmetric key;
  or,
  starting the authentication and key agreement and distribution process matching the anti-pseudo base station capacity of the base station when the mobile terminal accesses and attaches to a network through the base station with the anti-pseudo base station capacity or when the mobile terminal reselects a cell.

9. An anti-pseudo base station method, comprising:
  receiving, by a mobile terminal, first anti-pseudo base station capacity information sent by a base station, and determining whether the base station supports an anti-pseudo base station capacity according to the first anti-pseudo base station capacity information, and the first anti-pseudo base station capacity information further comprises a key system to which an anti-pseudo base station key supported or used by the base station belongs in a case where the base station supports the anti-pseudo base station capacity; and
  based on the key system, starting, by the mobile terminal, an authentication and key agreement and distribution process matching the anti-pseudo base station capacity of the base station and an anti-pseudo base station capacity of the mobile terminal;
  in a case that the first anti-pseudo base station capacity information sent by the base station indicates that the base station does not support the anti-pseudo base station capacity, the terminal performs an authentication and key agreement procedure without an anti-pseudo base station function.

10. The anti-pseudo base station method according to claim 9, wherein the anti-pseudo base station capacity of the mobile terminal is determined according to second anti-pseudo base station capacity information of the mobile terminal, wherein the second anti-pseudo base station capacity information is used for identifying the anti-pseudo base station capacity of the mobile terminal.

11. The anti-pseudo base station method according to claim 9, wherein the key system of the anti-pseudo base station key supported or used by the mobile terminal comprises a symmetric key, an asymmetric key, or a symmetric key and an asymmetric key.

12. The anti-pseudo base station method according to claim 10, further comprising pre-configuring the second anti-pseudo base station capacity information; or providing an anti-pseudo base station capacity information setting function, and determining the second anti-pseudo base station capacity information according to setting obtained via the anti-pseudo base station capacity information setting function.

13. The anti-pseudo base station method according to claim 9, wherein starting, by the mobile terminal, the authentication and key agreement and distribution process matching the anti-pseudo base station capacity of the base station and the anti-pseudo base station capacity of the mobile terminal comprises:
  starting, in a case where the anti-pseudo base station key of the mobile terminal is the symmetric key and the base station supports the symmetric key, the authentication and key agreement and distribution process corresponding to the symmetric key;
  or,
  starting, in a case where the anti-pseudo base station key of the mobile terminal is an asymmetric key and the base station supports the asymmetric key, the authentication and key agreement and distribution process corresponding to the asymmetric key;
  or,
  starting the authentication and key agreement and distribution process matching the anti-pseudo base station capacity of the base station and the anti-pseudo base station capacity of the mobile terminal when the mobile terminal accesses and attaches to a network through the base station with the anti-pseudo base station capacity identical to the anti-pseudo base station capacity of the mobile terminal or when the mobile terminal reselects a cell.

14. An anti-pseudo base station apparatus, comprising a memory and a processor, wherein the processor stores a program, and the program implements the anti-pseudo base station method according to claim 1 when read and executed by the processor.

15. A non-transitory computer-readable storage medium, wherein one or more programs are stored in the computer-readable storage medium, wherein the one or more programs are capable of being executed by one or more processors, so as to implement the anti-pseudo base station method according to claim 1.

16. An anti-pseudo base station apparatus, comprising a memory and a processor, wherein the processor stores a program, and the program implements the anti-pseudo base station method according to claim 5 when read and executed by the processor.

17. An anti-pseudo base station apparatus, comprising a memory and a processor, wherein the processor stores a program, and the program implements the anti-pseudo base station method according to claim 9 when read and executed by the processor.

* * * * *